United States Patent [19]

Im et al.

[11] Patent Number: 5,717,311

[45] Date of Patent: Feb. 10, 1998

[54] FAST-CHARGING DEVICE FOR RECHARGEABLE BATTERIES

[75] Inventors: Sang-Tae Im, Kyungki-do; Hwan-Ho Seoung, Seoul; Byung-Cho Choi, Inchun-Kwangyeoksi, all of Rep. of Korea

[73] Assignee: Samsung Electronics Co., Ltd., Suwon, Rep. of Korea

[21] Appl. No.: 639,088

[22] Filed: Apr. 24, 1996

[30] Foreign Application Priority Data

Apr. 24, 1995 [KR] Rep. of Korea ............ 95-9621

[51] Int. Cl.[6] .................... H02J 7/04; H01M 10/46
[52] U.S. Cl. .................... 320/20; 320/21; 320/23; 320/27; 320/32
[58] Field of Search .................... 320/20, 21, 22, 320/23, 30, 32, 33, 27

[56] References Cited

U.S. PATENT DOCUMENTS 5,477,125  12/1995  Ettel et al. ............... 320/20
5,541,490   7/1996  Sengupta et al. ........ 320/22 X Primary Examiner—Peter S. Wong
Assistant Examiner—Patrick B. Law
Attorney, Agent, or Firm—Cushman Darby & Cushman, IP Group of Pillsbury Madison & Sutro LLP

[57] ABSTRACT

A battery charging device for providing a fast charging a rechargeable battery and controlling the charging process to prevent overcharging. The battery charging device detects a decrease in the voltage of the rechargeable battery as it is being charged and approaches a full charge, and modulates the switching of a switching power supply supplying current to the rechargeable battery in response thereto. The battery charging device has a first resistor in series with the rechargeable battery which is to be charged, a power supply which charges the rechargeable battery, a charging control unit which detects a decrease in the voltage across the rechargeable battery using capacitors and which outputs battery condition signals and battery error signals in response thereto, and a power supply control unit which accepts a mode change signal and a battery error signal from the charging control unit and outputs a control signals for controlling the power supply.

13 Claims, 3 Drawing Sheets

5,717,311

FAST-CHARGING DEVICE FOR RECHARGEABLE BATTERIES

BACKGROUND OF THE INVENTION (1) Field of the Invention

The present invention relates to a battery charging device, and more particularly to a battery charging device used for fast-charging a rechargeable battery such as nickel cadmium/nickel hydrogen (NiCd/NiMH) battery with high current.

(2) Description of the Prior Art

Portable devices which use batteries as a power source have become widely used in todays society. In such devices, it has become convenient and more cost effective to use rechargeable batteries which can be charged repeatedly after use as the power source. Among the most common rechargeable batteries, the nickel cadmium/nickel hydrogen (NiCd/NiMH) battery has many superior features over other conventional rechargeable batteries, thus being commonly used in portable devices. However, overcharging of the nickel cadmium/nickel hydrogen battery poses serious and dangerous problems such as over heating and explosion. Overcharging often occurs in recharging systems which do not terminate the charging process accurately when the battery is fully charged. Therefore, conventional techniques have avoided the problems of overcharging these types of batteries by charging them slowly with small current levels. However, the conventional slow-charge has several disadvantages. For instance, the slow-charge method requires a significant amount of time to charge the batteries (i.e., many hours) and is ineffective with respect to use of energy.

SUMMARY OF THE INVENTION

A principle object of the present invention is to provide a battery charging device capable of charging rechargeable batteries quickly and safely, as is especially important in the case of charging nickel cadmium/nickel hydrogen batteries.

Another object of the present invention is to provide a battery charging device capable of controlling the current which charges the rechargeable battery by detecting a decrease in the voltage across the rechargeable battery being charged indicating a condition of a full charge.

A further object of the present invention is to provide a battery charging device capable of charging the battery without damaging the rechargeable battery by overcharging.

An advantage of the present invention is that the battery charging device allows fast and safe charging of the rechargeable battery. Another advantage of the present invention is that an integrated circuit of the elements, with the exception of the power supply, can be provided.

According to the present invention, a battery charging device includes a first resistor connected to a battery to be charged, and a power supply for charging the battery. A charging control means detects a decrease in the voltage of the rechargeable battery as it is being charged, and outputs battery condition signals and battery error signals. A power supply control means accepts the signals from the charging control means and outputs control signals for controlling the power supply.

The battery charging device of the present invention detects a decrease in the voltage across the rechargeable battery while it is being charged, and modulates the pulse width of the switching of a switching power supply so as to control the power supply accordingly. The present invention detects a decrease in the voltage across the rechargeable battery by utilizing the methodology of the conventional formula I=Cdv/dt. According to the methodology, upon a change in the voltage of the rechargeable battery, a fixed capacitor will produce a changed current.

In accordance with another embodiment of the present invention, test means is included which outputs the battery condition signals only if a voltage of the rechargeable battery is higher than a reference voltage.

In accordance with a further embodiment of the present invention, error detection means is provided. The error detection means outputs battery error signals if the voltage of the rechargeable battery is lower than a first reference voltage or is higher than a second reference voltage.

A further embodiment provides means for filtering high frequency noise from the voltage of the rechargeable battery.

Another embodiment includes means for outputting mode change signals corresponding to the battery condition signals.

In accordance with another embodiment of the present invention, means for detecting a current of the first resistor and compensating the current is further provided.

BRIEF DESCRIPTION OF THE DRAWINGS

These and other features and advantages of the present invention may be better and more completely understood by studying the following detailed description of the presently preferred embodiments together with the appended drawings, of which.

DETAILED DESCRIPTION OF THE PREFERRED EMBODIMENTS

Preferred embodiments of the present invention are described below with reference to the accompanying drawings. The specification and drawings of Korean Application No. 95-9621 filed on Apr. 24, 1995, from which this application claims priority, are explicitly incorporated herein by reference.

Figure 1:
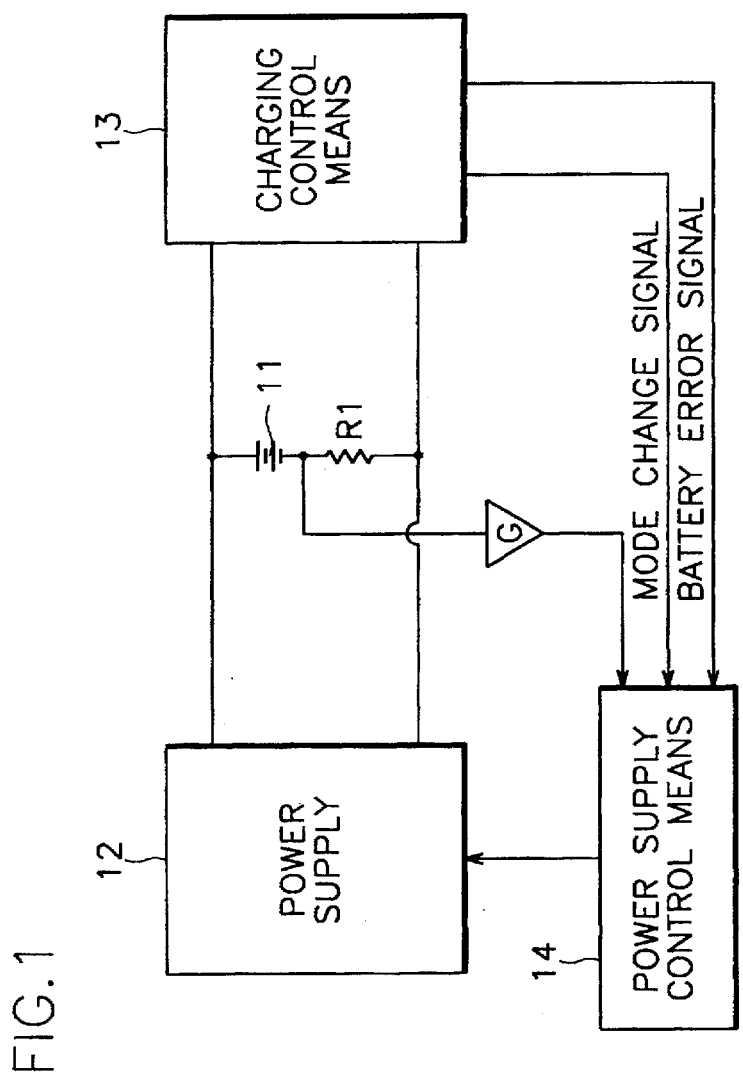
FIG. 1 is a simple block diagram showing a battery charging device in accordance with an embodiment of the present invention.

FIG. 1 shows a battery charging device in accordance with an embodiment of the present invention.

According to this embodiment, a first resistor R1 has a first end connected to a first end of a rechargeable battery 11 to be charged. As shown in FIG. 1, the negative side of the rechargeable battery 11 is connected to the first end of the first resistor R1.

A power supply 12 is used to supply a relatively high current to the rechargeable battery 11. A positive side of a power supply 12 is connected to the positive side of the rechargeable battery 11, and a negative side of the power supply 12 is connected to a second end of the first resistor R1.

A charging control unit 13 forms charging control means and is connected to the positive side of the rechargeable battery 11 and to the second end of the first resistor R1. The charging control unit 13 detects the voltage of the rechargeable battery 11 and outputs mode change signals and battery error signals in response thereto.

Power supply control means 14 accepts the mode change signals and the battery error signals from the charging control unit 13 and pulse width modulates the accepted signals. The power supply control means 14 then outputs a control signal for controlling a current density supplied from the power supply 12 to the rechargeable battery 11. The power supply control means 14 modulates a pulse width so as to supply a stable current to the rechargeable battery 11 by accepting the feedback voltage on the first resistor R1.

Figure 3:
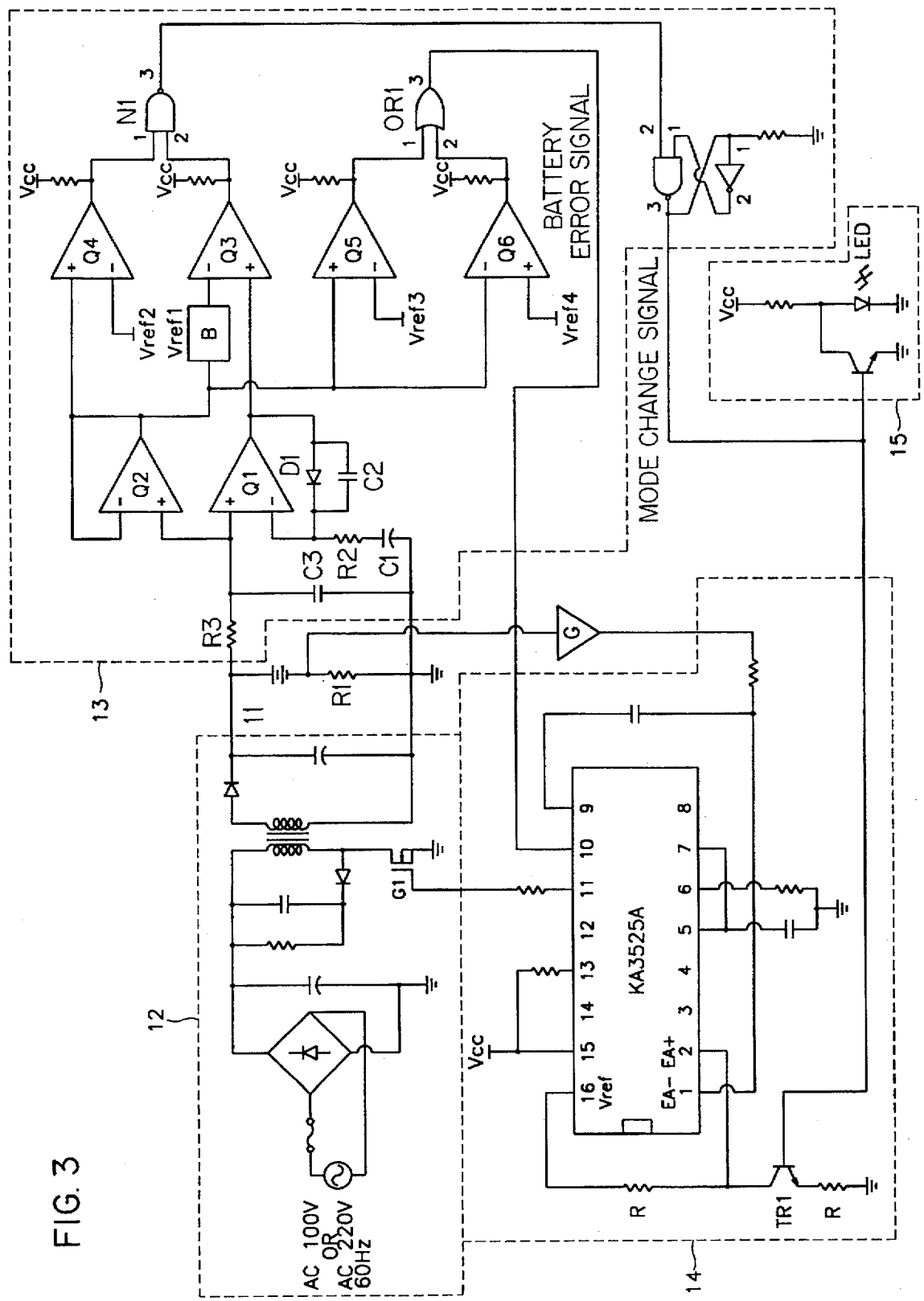
FIG. 3 is a circuit diagram of a battery charging device in accordance with an embodiment of the present invention.

FIG. 3 is a circuit diagram showing an embodiment of the battery charging device according to the present invention. FIG. 3 shows schematically the components of and connectivity between the power supply 12, the charging control unit 13, the power supply control means 14, and a light emitting diode (LED) display panel 15.

In the embodiment shown in FIG. 3, a switching mode power supply of flyback structure is used as the power supply 12, which produces a high current sufficient to fast-charge the rechargeable battery 11 in a relatively short period of time. A light emitting diode (LED) display panel 15 provided to display a charging mode according to the battery condition signals.

Figure 2:
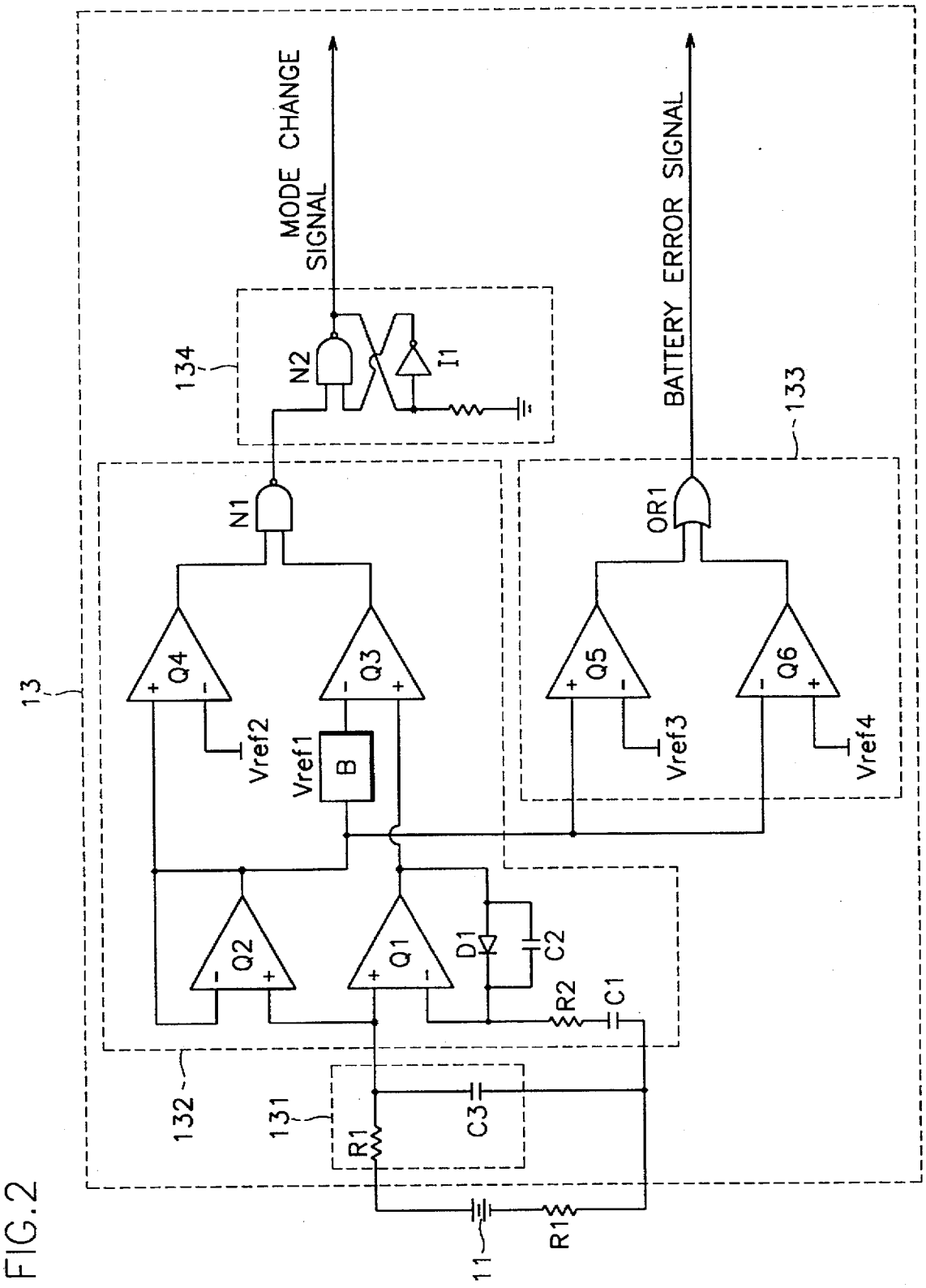
FIG. 2 is a circuit diagram of the charging control means shown in FIG. 3 in accordance with an embodiment of the present invention.

FIG. 2 shows the circuit diagram of the charging control unit 13 shown in FIG. 3. FIG. 2 shows in more detail the portions of the charging control unit 13 which make up the low pass filter 131, voltage decrease detecting unit 132, the battery error detecting unit 133, and mode change signal unit 134.

The charging control unit 13 produces battery condition signals by detecting a decrease in the voltage of the rechargeable battery 11 as the rechargeable battery 11 becomes fully charged. The charging control unit 13 provides a mode change signal and produces a battery error signal when the rechargeable battery 11 is in a condition of an open circuit or a short circuit.

The voltage decrease detecting unit 132 comprises a first capacitor C1 having a negative electrode connected (through the first resistor R1) to the negative electrode of the rechargeable battery 11, and having a positive electrode connected to a first end of a second resistor R2.

A first operation amplifier Q1 has a negative input terminal connected to the second end of the second resistor R2 and a positive input terminal connected (through a resistor K3) to the positive electrode of the rechargeable battery 11. A diode D1 has a cathode connected to the output terminal of the first operational amplifier Q1 and an anode connected to the negative input terminal of the first operational amplifier Q1. The diode in this embodiment is a silicon diode having a turn-on voltage of 0.6 to 0.7 volts. A second capacitor C2 is connected in parallel with the diode D1.

A second operational amplifier Q2 has a positive input terminal connected to the positive input terminal of the first operational amplifier Q1, and a negative input terminal fed back from an output terminal of the second operational amplifier Q2.

A first comparator Q3 has a positive input terminal connected to the output terminal of the first operational amplifier Q1 and a negative input terminal connected to the output terminal of the second operational amplifier Q2 through a voltage reference block B. The voltage reference block B shown in FIG. 2 decreases the voltage level of the output terminal of the second operational amplifier Q2 to a first reference voltage Vref1. In this embodiment, a diode is used as block B.

A second comparator Q4 is provided to output battery condition signals only when the voltage of rechargeable battery 11 is higher than a second reference voltage Vref2. A positive input terminal of the second comparator Q4 is connected to the output terminal of the second operational amplifier Q2, and a negative input terminal of the second comparator Q4 is connected to the second reference voltage Vref2. The outputs of the first and second comparators Q3, Q4 are input to a first NAND gate N1.

High frequency noise produced by the switching power supply 12 is filtered from the voltage of the rechargeable battery 11 by low pass filter 131. The low pass filter 131 includes a third resistor R3 and a third capacitor C3.

In operation, when the rechargeable battery 11 is being charged, the diode D1 is turned on and the second capacitor C2 is charged with the same voltage as the diode D1. The first capacitor C1 is also charged by the current which flows through diode D1 and the second resistor R2. The current charging the first capacitor C1 is defined by following Eq. 1:

$$i_{c1} = C1\ (dV_{bat}/dt) \qquad \text{(Eq. 1)}$$

In this case, the voltages of the positive and negative input terminals of the first operational amplifier Q1 are the same.

When the rechargeable battery 11 reaches full charge, the voltage of the rechargeable battery 11 drops down. Therefore, the current of the first capacitor C1 has negative value in accordance with Eq. 1 and the voltage of the first capacitor C1 is discharged through the second resistor R2 and the second capacitor C2. In this case the diode D1 is turned off and the current passes through the second capacitor C2. The current discharged through the second capacitor C2 is defined by the following Eq. 2:

$$i_{c1} = -C1\ (dV_{bat}/dt) \qquad \text{(Eq. 2)}$$

Therefore the voltage of the second capacitor C2 is defined by the following Eq. 3:

$$V_{c2} = (1/C2)\ (\int i_{c1} dt) = -(1/C2) \int C1\ (dV_{bat}/dt)\ dt = -(C1/C2) \Delta V_{bat} \qquad \text{(Eq. 3)}$$

The output of the first comparator Q3 is changed to a high logic level from a low logic level when the voltage of the second capacitor C2 drops below that of the first reference voltage Vref1. In other words, if the offset voltage between the positive and negative input terminals of the first operational amplifier Q1 is ignored, the output of the first comparator Q3 is maintained at a logic low level until the voltage of the second capacitor C2 increases to more than that of the first reference voltage Vref1 by discharging of the first capacitor C1.

When fast-charging a fully discharged rechargeable battery 11, the voltage of the rechargeable battery 11 is often decreased at the beginning of charging. Under ordinary conditions the battery condition signals would otherwise happen erroneously in response to this decreasing voltage of the rechargeable battery 11 despite the fact that the rechargeable battery is not yet fully charged. However, the second comparator Q4 and the first NAND gate N1 prevent the erroneous detection of the condition of the rechargeable battery 11. The second comparator Q4 is configured such that it does not output a logic high signal unless the voltage of the rechargeable battery 11 increases past that of the second reference voltage Vref2.

Thus, the second comparator Q4 indicates the point at which the voltage of the rechargeable battery 11 increases past that of the second reference voltage Vref2, and the first comparator Q3 indicates that the voltage of the rechargeable battery 11 has dropped (decreased). Thus, the output of the first NAND gate N1 changes to a logic low level from a logic high level when both conditions occur, i.e., when the voltage of the rechargeable battery 11 increases past that of the second reference voltage Vref2 and when the voltage of the rechargeable battery 11 drops.

The mode change signal unit 134 comprises a latch unit which produces the mode change signal. The latch unit comprises a second NAND gate N2 and an inverter I1. The latch unit thus provides a change in the mode change signal from the mode change signal unit 134 only once regardless of the battery condition signals provided by the first NAND gate N1.

The battery error detecting unit 133 comprises a third comparator Q5, a fourth comparator Q6, and a first OR gate OR1. The positive input terminal of the third comparator Q5 is connected to the output terminal of the second operational amplifier Q2, and the negative input terminal thereof is connected to a third reference voltage Vref3. The negative input terminal of the fourth comparator Q6 is connected to the output terminal of the second operational amplifier Q2, and the positive input terminal thereof is connected to the fourth reference voltage Vref4. The inputs of the OR gate OR1 are connected to the output terminals of the third and fourth comparators Q5,Q6. The output of the OR gate OR1 provides the battery error signal.

In operation, when the voltage of the third capacitor C3 increases past that of the third reference voltage Vref3 by an error condition, e.g., by an open circuit through the rechargeable battery 11, the output signal from the output terminal of the third comparator Q5 changes to a high logic level from a low logic level. When the voltage of the third capacitor C3 decreases below that of the fourth reference voltage Vref4 by an error condition, e.g., by a short circuit through the rechargeable battery 11, the outputs of the fourth comparator Q6 changes to a high logic level from a low logic level. Therefore, the OR gate OR1 of the battery error detecting unit 133 outputs the battery error signal when either one of the error conditions detected by the third or fourth comparators Q5,Q6 are present.

The power supply control 14 forming power supply control means is shown in FIG. 3.

The power supply control 14 accepts signals from the charging control unit 13 and pulse width modulates the signals to control the current from the power supply 12 to the rechargeable battery 11. In this embodiment, the component commercially available and known as KA3525A is used as a pulse width modulation control integrated circuit for driving the gate G1 of a MOSFET in the power supply 12, which is the switching element of the power supply 12. The KA3525A is a Voltage-Mode Pulse Width Modulator (PWM) Controller manufactured by Samsung Electronics Co., Ltd. The data sheet for the KA3525A is explicitly incorporated herein by reference thereto.

In operation, when the mode change signal changes to a logic high level from a logic low level, the first transistor TR1 of the power supply control unit 14 is turned on and the voltage on the second pin (EA+) of the integrated circuit KA3525A is changed to R2*Vref/(R1+R2). Therefore, the duty cycle on pin 11 of the KA3525A is decreased and the current from the power supply 12 is decreased to the rechargeable battery 11.

When the battery error signal changes to a logic high level from a logic low level, pin 10 of the KA3525A component accepts the signal and shuts down the current flowed to the rechargeable battery 11.

According to the present invention, the charging control unit 13 and the power supply control unit 14 can be provided in a single integrated circuit.

A primary advantage of the battery charging device according to the present invention is that it provides a battery quickly device which can charge a rechargeable battery quickly without risking or causing damage to the rechargeable battery due to over-charging. Moreover, the battery charging device according to the present invention is unaffected by various conditions of surrounding.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A battery charging device, comprising:
   a first resistor connected in series with a rechargeable battery to be charged;
   a power supply connected to supply electrical current through said series connection of said first resistor and said rechargeable battery;
   charging control means, connected to said rechargeable battery and said first resistor, for detecting a decrease in a voltage across said rechargeable battery and outputting a battery condition signal indicating that said voltage across said rechargeable battery has decreased, wherein said charging control means comprises:
   a first capacitor having a negative electrode connected to a negative electrode of said rechargeable battery;
   a second resistor connected in series with said first capacitor;
   a first operation amplifier having a negative input terminal connected in series with said series connection of said first capacitor and said second resistor, and having a positive input terminal connected to a positive electrode of said rechargeable battery;
   a diode having a cathode connected to an output terminal of said first operation amplifier and having an anode connected to said negative input terminal of said first operation amplifier;
   a second capacitor connected in parallel with said diode;
   a second operation amplifier having a positive input terminal connected to said positive input terminal of said first operation amplifier, and having a negative input terminal connected to an output terminal of said second operational amplifier; and
   a first comparator having a positive input terminal connected to said output terminal of said first operation amplifier, and having a negative input terminal connected to said output terminal of said second operation amplifier; and
   power supply control means for controlling said power supply in accordance with said battery condition signal.

2. The battery charging device according to claim 1, wherein said charging control means further comprises:
   battery condition output means for outputting said battery condition signal only if said voltage of said rechargeable battery is higher than a predetermined first reference voltage.

3. The battery charging device according to claim 2, wherein said battery condition output means comprises:
   a second comparator having a positive input terminal connected to said output terminal of said second amplifier, and having a negative input terminal connected to said first predetermined reference voltage; and a first NAND gate having a first input terminal connected to said output terminal of said first comparator, and having a second input terminal connected to said output terminal of said second comparator.

4. The battery charging device according to any one of claims 1 to 3, wherein said charging control means further comprises:

battery error signal output means for outputting a battery error signal if said voltage of said rechargeable battery is at least one of: lower than a predetermined second reference voltage, and higher than a predetermined third reference voltage.

5. The battery charging device according to any one of claims 1 to 3, wherein said charging control means further comprises:

filter means for filtering high frequency noise from said voltage of said rechargeable battery.

6. The battery charging device according to any one of claims 1 to 3, wherein said charging control means further comprises:

mode change means for outputting a mode change signal corresponding to said battery condition signal.

7. The battery charging device according to any one of claims 1 to 3, wherein said power supply control means comprises:

compensation means for detecting a current through said first resistor and compensating said current through said first resistor to be constant.

8. A battery charging device, comprising:

a first resistor connected in series with a rechargeable battery to be charged;

a power supply connected to supply electrical current through said series connection of said first resistor and said rechargeable battery;

charging control means, connected to said rechargeable battery and said first resistor, for detecting a decrease in a voltage across said rechargeable battery and outputting a battery condition signal indicating that said voltage across said rechargeable battery has decreased, wherein said charging control means comprises:

filter means for filtering high frequency noise from said voltage of said rechargeable battery; and power supply control means for controlling said power supply in accordance with said battery condition signal.

9. A battery charging device comprising:

a first resistor connected in series with a rechargeable battery to be charged;

a power supply connected to supply electrical current through said series connection of said first resistor and said rechargeable battery;

charging control means connected to said rechargeable battery and said first resistor, for detecting a decrease in a voltage across said rechargeable battery and outputting a battery condition signal indicating that said voltage across said rechargeable battery has decreased, wherein said charging control means comprises:

battery error signal output means for outputting a battery error signal if said voltage of said rechargeable battery is at least one of: lower than a predetermined second reference voltage, and higher than a predetermined third reference voltage; and power supply control means for controlling said power supply in accordance with said battery condition signal.

10. A battery charging device, comprising:

a first resistor connected in series with a rechargeable battery to be charged; a switching power supply connected to supply electrical current through said series connection of said first resistor and said rechargeable battery sufficient for a fast-charging operation of said rechargeable battery in less than approximately one hour;

a charging control unit, connected to said rechargeable battery, for detecting, while said rechargeable battery is being recharged, a decrease in a voltage across said rechargeable battery due to a full charge condition of said rechargeable battery, said charging control unit outputting a battery condition signal when said decrease in said voltage across said rechargeable battery has been detected; and power supply control means for terminating said fast-charging operation of said rechargeable battery in accordance with an occurrence of said battery condition signal, said power supply control means controls a switching operation of said switching power supply in accordance with said battery condition signal.

11. A battery charging device, comprising:

a first resistor connected in series with a rechargeable battery to be charged;

a supply connected to supply electrical current through said series connection of said first resistor and said rechargeable battery sufficient for a fast-charging operation of said rechargeable battery in less than approximately one hour;

a charging control unit connected to said rechargeable battery, for detecting, while said rechargeable battery is being recharged, a decrease in a voltage across said rechargeable battery due to a full charge condition of said rechargeable battery, said charging control unit outputting a battery condition signal when said decrease in said voltage across said rechargeable control has been detected, wherein said charging control unit comprises:

a first capacitor and a second resistor connected in series, said series connection of said first capacitor and said second resistor being connected so that said first capacitor is charged in parallel with said rechargeable battery, a voltage of said first capacitor decreasing in correspondence with said decrease in said voltage of said rechargeable battery; and power supply control means for terminating said fast-charging operation of said rechargeable battery in accordance with an occurrence of said battery condition signal.

12. A battery charging device, comprising:

a first resistor connected in series with a rechargeable battery to be charged;

a power supply connected to supply electrical current through said series connection of said first resistor and said rechargeable battery sufficient for a fast-charging operation of said rechargeable battery in less than approximately one hour;

a charging control unit, connected to said rechargeable battery, for detecting, while said rechargeable battery is being recharged, a decrease in a voltage across said rechargeable battery due to a full charge condition of said rechargeable battery, said charging control unit outputting a battery condition signal when said decrease in said voltage across said rechargeable battery has been detected;

power supply control means for terminating said fast-charging operation of said rechargeable battery in accordance with an occurrence of said battery condition signal; and a latch to latch said battery condition signal such that said decrease in said voltage across said rechargeable battery need only be detected once during a recharging cycle.

13. A battery charging device, comprising:

a first resistor connected in series with a rechargeable battery to be charged;

a power supply connected to supply electrical current through said series connection of said first resistor and said rechargeable battery;

charging control means, connected to said rechargeable battery and said first resistor, for detecting a decrease in a voltage across said rechargeable battery and outputting a battery condition signal indicating that said voltage across said rechargeable battery has decreased; and power supply control means for controlling said power supply in accordance with said battery condition signal, wherein said power supply control means comprises:

compensation means for detecting a current through said first resistor and compensating said current through said first resistor to be constant.

* * * * *